US012014891B2

(12) United States Patent
Lu et al.

(10) Patent No.: US 12,014,891 B2
(45) Date of Patent: Jun. 18, 2024

(54) PLUG-IN CIRCUIT BREAKER

(71) Applicant: ZHEJIANG CHINT ELECTRICS CO., LTD., Zhejiang (CN)

(72) Inventors: Kejun Lu, Zhejiang (CN); Xiangyi Gu, Zhejiang (CN); An Yang, Zhejiang (CN); Jun Zhu, Zhejiang (CN); Shaojun Guo, Zhejiang (CN)

(73) Assignee: ZHEJIANG CHINT ELECTRICS CO., LTD. (CN)

( * ) Notice: Subject to any disclaimer, the term of this patent is extended or adjusted under 35 U.S.C. 154(b) by 226 days.

(21) Appl. No.: 17/776,374

(22) PCT Filed: Nov. 14, 2020

(86) PCT No.: PCT/CN2020/128879
§ 371 (c)(1),
(2) Date: May 12, 2022

(87) PCT Pub. No.: WO2021/093879
PCT Pub. Date: May 20, 2021

(65) Prior Publication Data

US 2022/0415600 A1 Dec. 29, 2022

(30) Foreign Application Priority Data

Nov. 15, 2019 (CN) ......................... 201911121721.7

(51) Int. Cl.
*H01H 71/58* (2006.01)
*H01H 1/36* (2006.01)
(Continued)

(52) U.S. Cl.
CPC .......... *H01H 71/1009* (2013.01); *H01H 1/36* (2013.01); *H01H 71/04* (2013.01); *H01H 71/58* (2013.01)

(58) Field of Classification Search
CPC ...... H01H 71/025; H01H 71/04; H01H 71/58; H01H 71/1009
See application file for complete search history.

(56) References Cited

U.S. PATENT DOCUMENTS 6,480,079 B1 11/2002 Bentley et al. .................. 335/6

FOREIGN PATENT DOCUMENTS

CN 107833799 A 3/2018
CN 207624637 U * 7/2018 ............. H01H 71/08
(Continued)

OTHER PUBLICATIONS

International Search Report mailed Feb. 20, 2021 in corresponding PCT International Application No. PCT/CN2020/128879.
(Continued)

*Primary Examiner* — Ramon M Barrera
(74) *Attorney, Agent, or Firm* — OSTROLENK FABER LLP

(57) ABSTRACT

A plug-in circuit breaker that includes a circuit breaker housing with a limiting hole and a opening and closing button. The circuit breaker further includes a locking member rotatably arranged inside the circuit breaker housing with an upper portion close to the limiting hole provided with a locking protrusion fitting. A lower portion of the circuit breaker housing is provided with a locking driving surface fitting with the opening and closing button. When the limiting hole is not shielded, the opening and closing button jacks up the locking driving surface to enable the locking protrusion to extend out of the limiting hole. The plug-in circuit breaker is closed when the limiting hole is shielded, so that the locking protrusion cannot extend out of the limiting hole. The locking driving surface limits the opening and closing button, so that the opening and closing button cannot press to the destined position.

12 Claims, 3 Drawing Sheets

(51) Int. Cl.
*H01H 71/04* (2006.01)
*H01H 71/10* (2006.01)

(56) References Cited

FOREIGN PATENT DOCUMENTS

| | | | |
|---|---|---|---|
| CN | 109585233 | A | 4/2019 |
| CN | 111489937 | A | 8/2020 |
| EP | 0849759 | A1 | 6/1998 |

OTHER PUBLICATIONS

Written Opinion mailed Feb. 20, 2021 in corresponding PCT International Application No. PCT/CN2020/128879.

* cited by examiner

PLUG-IN CIRCUIT BREAKER

CROSS-REFERENCE TO RELATED APPLICATIONS

The present application is a 35 U.S.C. §§ 371 national stage application of International Application No. PCT/CN2020/128879, filed Nov. 14, 2020, which claims priority to Chinese Patent Application No. 201911121721.7, filed Nov. 15, 2019, the contents of both of which are incorporated herein by reference.

FIELD OF THE INVENTION

The present invention relates to the field of low-voltage electrical appliances, in particular to a plug-in circuit breaker.

BACKGROUND OF THE INVENTION

With the rapid development of the network communication technology, especially the application and popularization of 5G networks, the circuit breaker is required to effectively improve the safety of electrical equipment more and more highly, but the traditional terminal circuit breaker required to connect a plurality of sockets and plug-in boards in traditional power supply mode is far less likely to meet the requirements of electric safety and equipment protection. The terminal circuit breakers used in 5G communication equipment not only are expected to improve the performance in miniaturization, intelligence, reliability, stability and the like, but also have developed a lot of new mating structures in use requirements, such as, convenient plug-in and plug-out operations like receptacle plugs, of circuit breakers, which are novel circuit breakers referred to as plug-in circuit breakers, but not the circuit breakers pertaining to any one of a conventional plug-in type, plug-in and plug-out type, drawer-type and universal type. The novel plug-in circuit breakers not only can provide various safety protection performance of a circuit breaker for power line and electrical equipment, but also can meet the requirements of various electric appliances on the power supply quality, enabling circuit breakers to be conveniently connected/disconnected to a circuit in a plug-in and plug-out mode. To this end, the structure of the plug-in circuit breaker has evolved to a wide range, but in the development trend of miniaturizing electrical equipment, it is still necessary to further improve, optimize and upgrade the overall structure and operation mode of the mating circuit breaker.

Although the plug-in circuit breaker has obvious advantages in quick installation to the cabinet, the potential safety hazards brought by quickly plugging and plucking plugs to the circuit breaker is further upgraded, including many risks with energized operations, such as, mistakenly installing the circuit breaker into the cabinet in the closing state, the circuit breaker being closed when the circuit breaker is not installed to the destined position, and mistakenly pulling the circuit breaker out of the cabinet in the closing state.

In order to prevent the risks with energized operations, the existing plug-in circuit breaker is usually provided with a corresponding locking mechanism, but the existing locking mechanism has relatively complex structures, and usually needs to configure the corresponding locking member, unlocking member, transmission member and other mechanisms, thereby involving more parts, occupying a large space, and relatively complicating transmission fit.

In addition, the locking mechanism of the plug-in circuit breaker of the prior art can only be provided with a locking mechanism for preventing some potential safety hazards in the locking mechanism, for example, preventing the circuit breaker from being inserted into the cabinet under the closing state, rather than preventing the circuit breaker from being pulled out of the cabinet under the closing state. Still in another kind of prior art, although the circuit breaker can be prevented from being pulled out of the cabinet in the closing state, during installing the circuit breaker into the cabinet in the opening state, such prior art cannot prevent the circuit breaker from mistakenly closing with user intervention when the circuit breaker is not completely installed in the destined position. Therefore, a set of locking apparatuses cannot be solely used to prevent multiple plug-in operations of the circuit breaker in the closing state (preventing closing before inserting into the cabinet and preventing closing during inserting into the cabinet).

In order to enable the existing plug-in circuit breaker with pluggable and pluckable plugs to have a plurality of protection functions, in the prior art multiple sets of independent locking apparatuses often must be arranged in parallel in the circuit breaker, so that the circuit breaker can be prevented from being mistakenly pulled out of the cabinet in the closing state of the circuit breaker. For example, one set of independent locking apparatuses used for preventing pulling out of the cabinet in the closing state is required to arranged in the same circuit breaker, further another set of independent locking apparatuses used for preventing insertion into the cabinet in the closing state, sometimes even two sets of independent locking apparatuses are required, such as a locking apparatuses used for preventing closing before insertion into the cabinet, and a locking apparatuses used for preventing closing during insertion into the cabinet. Multiple sets of locking mechanisms coexist to increase the number of parts of the locking apparatus, and the damage in any one of the sets causes to abandon the apparatus. Multiple sets of locking mechanisms require independent space to be installed, so that the circuit breaker cannot be further miniaturized. The activation relation between each locking mechanism and other systems is independent, the internal movement of each locking apparatus also has independence, the installation positions between the independent locking apparatuses need to be dislocated, so its structure is complex, and its implementation is tedious for functions. When the independent locking apparatuses are parallel to each other, there will be a plurality of locking protrusions respectively extending out of the window of the circuit breaker, resulting in extreme proneness to misoperation, increase in potential safety hazards, and poor experiences for users.

SUMMARY OF THE INVENTION

The present invention aims to provide a plug-in circuit breaker with a simple structure and high reliability.

In order to achieve the above object, the present invention adopts the following technical solutions:

A plug-in circuit breaker comprising a circuit breaker housing provided with a limiting hole and a opening and closing button, wherein the circuit breaker further includes a locking member, the locking member is rotatably arranged inside the circuit breaker housing, and has the upper portion close to the limiting hole provided with a locking protrusion fitting with the limiting hole, and the lower portion provided with a locking driving surface fitting with the opening and closing button; pressing the opening and closing button enables the opening and closing button to abut against the locking driving surface of the locking member, thus the locking protrusion of the driving locking member rotates to the limiting hole of the circuit breaker housing, when the limiting hole is not shielded, the opening and closing button jacks up the locking driving surface to enable the locking protrusion to extend out of the limiting hole, and the plug-in circuit breaker is closed, when the limiting hole is shielded, so that the locking protrusion cannot extend out of the limiting hole, thus the locking driving surface limits the opening and closing button, so that the opening and closing button cannot press to the destined position, and the plug-in circuit breaker cannot be closed.

Preferably, pulling the opening and closing button enables the plug-in circuit breaker to open, and meanwhile, the locking member rotates to retract the locking protrusion into the circuit breaker housing.

Preferably, one end of the opening and closing button close to the locking member is provided with a driving protrusion fitting with the locking driving surface.

Preferably, the locking member has the lower portion of one end away from the limiting hole further provided with an activated protruding stand, one side of the activated protruding stand is connected with the locking driving surface, when pulling out the opening and closing button enables the circuit breaker to switch from the closing state to the opening state, the driving protrusion of the opening and closing button pulls the activated protruding stand to enable the opening and closing button to rotate, so that the locking protrusion rotates and retracts into the circuit breaker housing.

Preferably, one end of the opening and closing button extending into the circuit breaker is a driving end, a button limiting groove is arranged on one side, close to the locking member, of the driving end of the opening and closing button, the driving protrusion is arranged on one side, close to the locking protrusion, of the button limiting groove, when the circuit breaker is in the closing state, the activated protruding stand of the locking member obliquely abuts against the side of the button limiting groove away from the locking protrusion.

Preferably, the locking protrusion is a square protruding stand.

Preferably, when the plug-in circuit breaker is in the closing state, the driving protrusion is positioned right below the locking protrusion and the limiting hole.

Preferably, an acute angle is formed between the activated protruding stand and the locking driving surface.

Preferably, the plug-in circuit breaker is in the closing state, the locking driving surface has an included angle $\alpha$ between itself and the movement direction of the opening and closing button, the included angle $\alpha$ is less than 15 degrees.

Preferably, an operating mechanism drivingly connected with the opening and closing button, a movable contact connected with the operating mechanism, a stationary contact fitting with the movable contact, an arc extinguishing mechanism, a wire-outlet end and a wire-inlet end are arranged inside the circuit breaker housing, the opening and closing button and the wire-outlet end are arranged at one end of the circuit breaker housing, the wire-inlet end is arranged at the other end of the circuit breaker housing, the upper side of the circuit breaker housing is provided with the limiting hole, the locking member is rotatably arranged between the opening and closing button and the limiting hole.

Preferably, the operating mechanism is arranged on one side of the opening and closing button, and the operating mechanism and the overload protection apparatus are arranged side by side on one side of the opening and closing button and the wire outlet end, the short-circuit protection mechanism is positioned between the operating mechanism and the wire inlet end, the short-circuit protection mechanism and the arc extinguishing mechanism are arranged side by side, and positioned on one side of the operating mechanism and the overload protection apparatus.

Preferably, a rotation center is provided in the middle of the locking member, the rotation center is arranged deviating away from one end of the locking protrusion, the locking member has the lower portion of one end away from the limiting hole further provided with an activated protruding stand, one side of the activated protruding stand is connected with the locking driving surface, one end of said opening and closing buttonclose to said locking member is provided with a driving protrusion, said driving protrusion and the locking driving surface always keep slidable fit with each other.

According to the locking apparatus of the plug-in circuit breaker of the present invention, just making a locking member fit with a opening and closing button enables a plurality of locking functions, such as: (1) when the circuit breaker is closed outside the cabinet, it cannot be installed to the operating position, thereby avoiding risks with energized operations; (2) during installing the plug-in circuit breaker to the installation-position of the cabinet, it cannot complete the closing action when it is not installed to the operating position, thereby avoiding risks with energized operations; (3) when the plug-in circuit breaker is installed to the correct operating position of the cabinet, the opening and closing button can normally realize closing and opening operations, but in the closing state, the locking apparatus can lock the plug-in circuit breaker in the operating position, so that the plug-in circuit breaker cannot be easily pulled out, avoiding the energized plug-in and plug-out operations, and greatly improving the use safety of the plug-in circuit breaker, furthermore it has a very simple structure and low costs.

DETAILED DESCRIPTION OF SOME EMBODIMENTS

We further describe the embodiments of the plug-in circuit breaker according to the present invention as follows in combination with the examples. The plug-in circuit breaker of the present invention is not limited to the description of the following embodiments.

Figure 6:
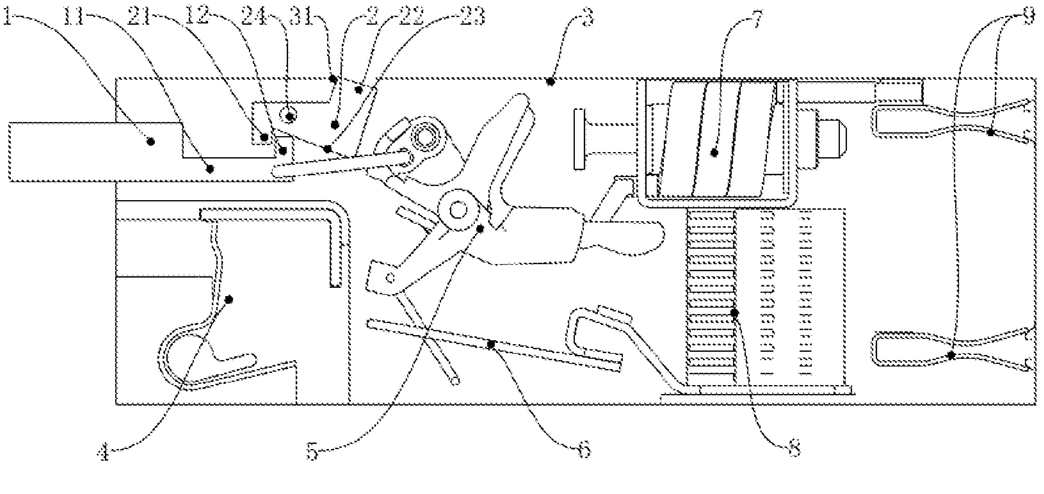
FIG. 6 is an overall structure view of the circuit breaker.

As shown in FIG. 6, in an embodiment of the plug-in circuit breaker, the breaker includes the circuit breaker housing 3. The opening and closing button 1 used for actuating the circuit breaker to open and close is arranged on the circuit breaker housing 3, and the operating mechanism 5 drivingly connected with the opening and closing button 1, the movable contact connected with the operating mechanism, the stationary contact fitting with the movable contact, the arc extinguishing mechanism 8, the wire-outlet end 4 and the wire-inlet end 9 are arranged inside the circuit breaker housing 3. The opening and closing button 1 and the wire-outlet end 4 are arranged at one end of the circuit breaker housing 3, and the wire-inlet end 9 is arranged at the other end of the circuit breaker housing 3. Pressing the opening and closing button 1 enables the opening and closing button 1 to actuate the movable contact and the stationary contact to be in contact with each other by the operating mechanism 5; pulling the opening and closing button 1 enables the opening and closing button 1 to actuate the operating mechanism 5 to separate the movable contact and the stationary contact from each other and plug-in circuit breaker open. The overload protection apparatus 6 is further arranged inside the circuit breaker housing 3, the operating mechanism trips when the dual metal piece of the overload protection apparatus 6 bends during overload. The short-circuit protection mechanism 7 and/or the leakage protection apparatus may also be arranged inside the circuit breaker housing 3, thus the operating mechanism is activated to trip when a short circuit or an electric leakage occurs. The wire-inlet end 9 is a socket-type connecting terminal, and connected to the plug-in conductor inside the installation position 900 when the plug-in circuit breaker is inserted into the cavitated installation position 900 of the cabinet.

A locking apparatus is further arranged in the plug-in circuit breaker, the limiting hole 31 fitting with the locking apparatus is arranged on the circuit breaker housing 3 of the plug-in circuit breaker, and the cabinet limiting hole 901 corresponding to the limiting hole 31 of the plug-in circuit breaker is arranged on the installation position 900 of the cabinet. When the plug-in circuit breaker is arranged to the operating position, the limiting hole 31 of the plug-in circuit breaker corresponds to the cabinet limiting hole 901, and when the plug-in circuit breaker is not installed to the operating position, the limiting hole 31 of the plug-in circuit breaker is misaligned with the cabinet limiting hole 901, as it pertains to the prior art in the art, details for it are not described herein again.

Figure 1:
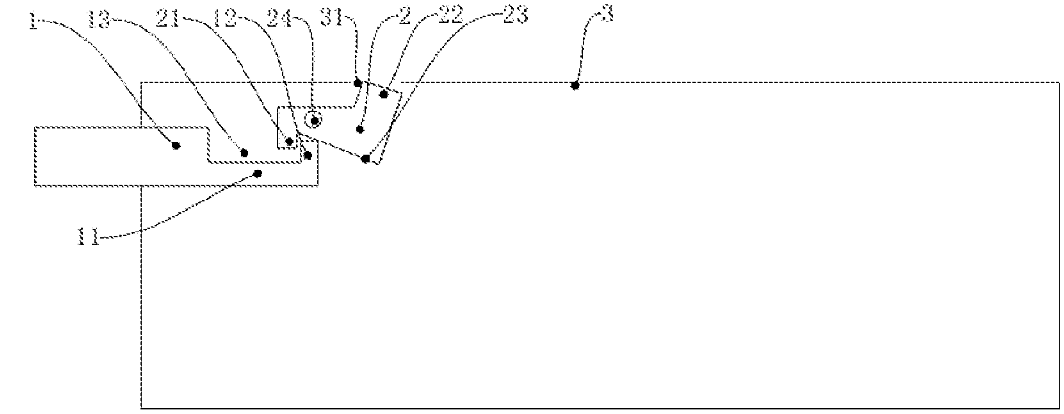
FIG. 1 is a structure view of the locking member and the opening and closing button of the circuit breaker according to the present invention.
Figure 2:
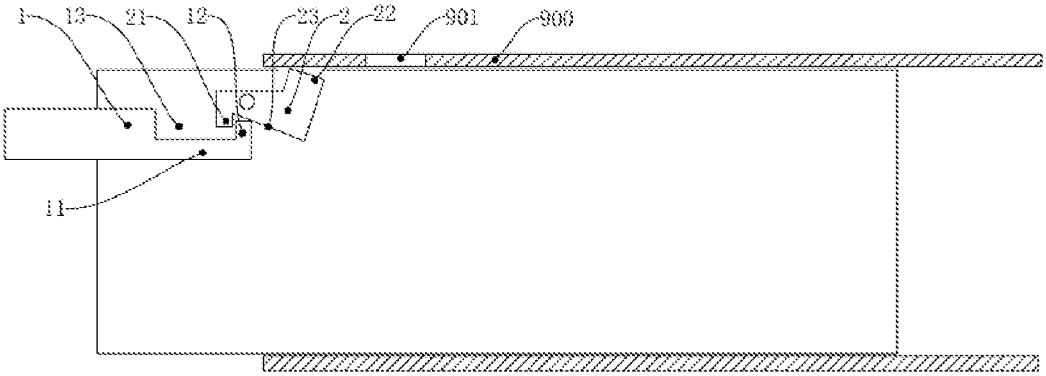
FIG. 2 is a position state view of the locking member and the opening and closing button during not correctly installing the circuit breaker to the operating position.
Figure 3:
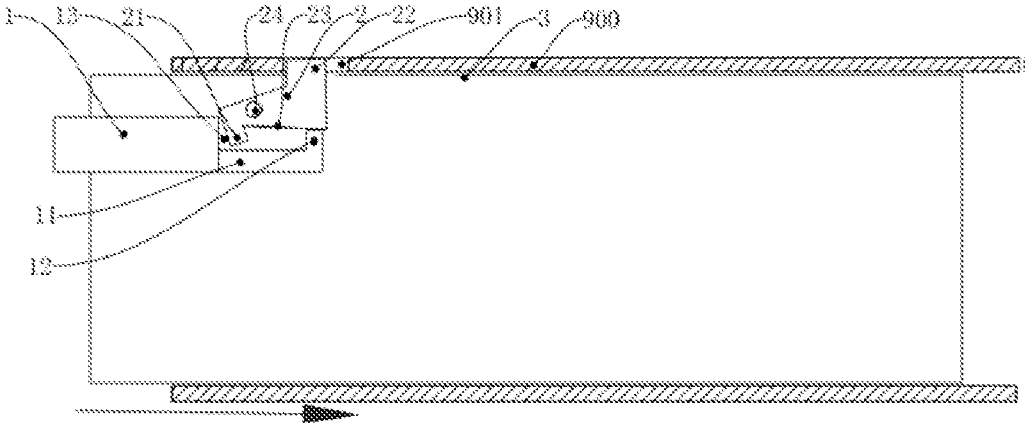
FIG. 3 is a position state view of the locking member and the opening and closing button during correctly installing the circuit breaker in the cabinet and in the closing state.

As shown in FIGS. 1-3, the plug-in circuit breaker of the present invention includes the circuit breaker housing 3 provided with the limiting hole 31, the opening and closing button 1 and the locking apparatus. The plug-in circuit breaker has a main improvement on that the locking apparatus includes the locking member 2 installed inside the plug-in circuit breaker, and the locking member 2 is rotatably arranged inside the circuit breaker housing 3, and has the upper portion provided with the locking protrusion 22 fitting with the limiting hole 31, and the lower portion provided with the locking driving surface 23 fitting with the opening and closing button 1. Pressing the opening and closing button 1 enables the opening and closing button 1 to abut against the locking driving surface 23 of the locking member 2, thus the locking protrusion 22 of the driving locking member 2 rotates to the limiting hole 31 of the circuit breaker housing 3. When the limiting hole 31 is not shielded, the locking protrusion 22 can extend out of the limiting hole 31, at this time the opening and closing button 1 jacks up the locking driving surface 23 to enable the locking protrusion to extend out of the limiting hole 31, and the plug-in circuit breaker is closed. When the limiting hole 31 is shielded, so that the locking protrusion 22 cannot extend out of the limiting hole 31, thus the locking driving surface 23 limits the opening and closing button 1, so that the opening and closing button 1 cannot press to the destined position, and the plug-in circuit breaker cannot be closed.

As shown in FIG. 3, the plug-in circuit breaker has been installed to the operating position, the limiting hole 31 of the plug-in circuit breaker corresponds to the cabinet limiting hole 901, at the moment, pressing the opening and closing button enables the opening and closing button 1 to slidably fit with the locking driving surface 23, butting against the locking driving surface 23 of the locking member 2 enables the locking protrusion 22 of the driving locking member 2 to rotate towards the limiting hole 31 of the circuit breaker housing 3, so that the locking protrusion 22 can extend out of the limiting hole 31 and the cabinet limiting hole 901. The opening and closing button 1 jacks up the locking driving surface 23, thus the opening and closing button 1 can continue to press the closing position, so that the plug-in circuit breaker is closed. After the circuit breaker is closed, the locking protrusion 22 is limited by the cabinet limiting hole 901, so that the plug-in circuit breaker is correctly installed into the cabinet, and cannot be pulled out of the installation position of the cabinet, avoiding energized plug-in and plug-out operations.

As shown in FIG. 2, the plug-in circuit breaker is not installed to the operating position, and the limiting hole 31 of the plug-in circuit breaker is misaligned with the cabinet limiting hole 901, thus the limiting hole 31 of the plug-in circuit breaker is shielded by the sheet metal part of the installation position 900 of the cabinet, so that the locking protrusion 22 of the locking member 2 is limited by the cabinet, and cannot rotate from the limiting hole 31 to extend out of the circuit breaker. At this time, pressing the opening and closing button 1 does not enable the opening and closing button 1 to fully jack up the locking driving surface 23 as the locking protrusion 22 is limited by the cabinet sheet metal part, thus the locking driving surface 23 is obliquely arranged in the movement direction of the opening and closing button 1. Limiting the opening and closing button 1 does not enable the opening and closing button 1 to move into the inside of the circuit breaker, nor can press to the destinated position, so that the plug-in circuit breaker cannot be closed in the installation position of the cabinet, avoiding energized operations.

Figure 4:
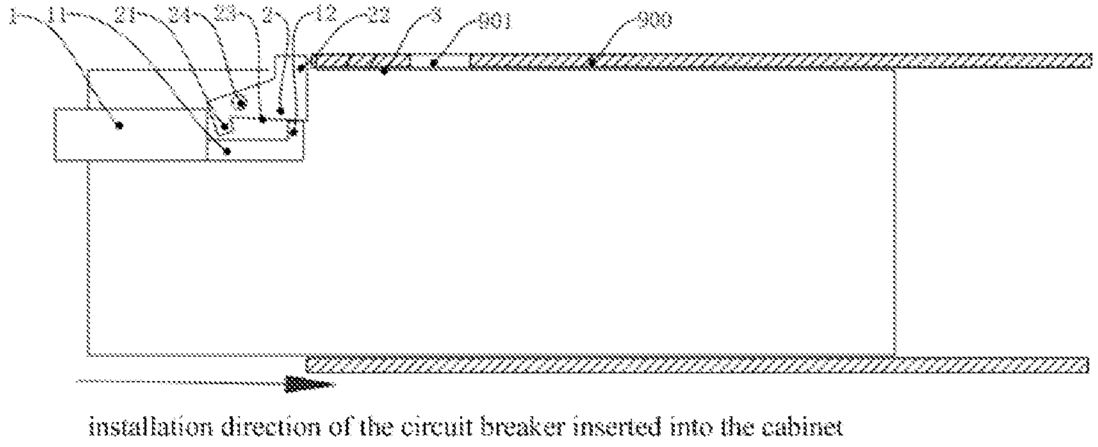
FIG. 4 is a position state view of the locking member and the opening and closing button during the circuit breaker is closed outside the cabinet.

As shown in FIG. 4, the plug-in circuit breaker is closed outside the cabinet, pressing the opening and closing button 1 enables the closing and opening 1 to move toward the inside of the circuit breaker, thus the opening and closing button 1 abuts against the locking driving surface 23 of the locking member 2, so as to actuate the locking protrusion 22 of the locking member 2 rotate toward the limiting hole 31 of the circuit breaker housing 3. As the limiting hole 31 is not shielded, the opening and closing button 1 jacks up the locking driving surface 23, so that the locking protrusion 22 extends out of the limiting hole 31 and is exposed outside the circuit breaker, and the opening and closing button 1 can continue to press to the closing position, so as to enable close the plug-in circuit breaker. At this time, the locking protrusion 22 protrudes from the limiting hole 31 and surmounts the installation position 900 of the cabinet, and the locking protrusion 22 abuts against the cabinet sheet metal part of the installation position 900, so that the plug-in circuit breaker cannot be inserted into the operating position of the installation position of the cabinet, avoiding energized operations.

In the locking apparatus of the plug-in circuit breaker of the present invention, One locking member 2 fits with the opening and closing button 1 enabling a plurality of locking functions including: 1. after the circuit breaker is closed outside the cabinet, it cannot be installed to the operating position, thereby avoiding risks with energized operations; 2. during installing the plug-in circuit breaker into the installation position of the cabinet, when the plug-in circuit breaker is not installed to the operating position, it cannot be closed, thereby avoiding risks with energized operations; 3. when the plug-in circuit breaker is installed to the correct operating position of the cabinet, the opening and closing button 1 can normally realize the closing and opening operations, but in the closing state, the locking apparatus can lock the plug-in circuit breaker in the operating position, so that it cannot be easily pulled out, avoiding plug-in and plug-out operations with energized operations, greatly improving the use safety of the plug-in circuit breaker, and having a very simple structure and low costs.

As shown in FIG. 1, in a preferred embodiment of the locking apparatus of the plug-in circuit breaker of the present invention, the locking member 2 is provided with the rotating center 24, and the circuit breaker housing 3 is provided with the limiting hole 31. The locking protrusion 22 arranged correspondingly to the limiting hole 31 is arranged on one end away from the rotating center and close to the upper portion of the locking member 2, and the lower portion of the locking member 2 away from the limiting hole 31 is provided with the locking driving surface 23 fitting with the opening and closing button 1. The locking member 2 can rotate around the rotation center 24 toward one side to enable the locking protrusion 22 to extend out of the limiting hole 31 or rotate around the rotation center 24 toward the other side to enable the locking protrusion 22 to retract into the circuit breaker housing 3.

Pressing the opening and closing button 1 enables the opening and closing button 1 to abut against the locking driving surface 23 of the locking member 2, so that the opening and closing button 1 and the locking driving surface 23 always keep slidable fit with each other, and the locking protrusion 22 of the driving locking member 2 rotates to the limiting hole 31 of the circuit breaker housing 3. When the locking protrusion 22 can extend out of the limiting hole 31, the opening and closing button 1 jacks up the locking driving surface 23, and enables the plug-in circuit breaker to be closed. After the circuit breaker is closed, the opening and closing button 1 limits the locking member 2, so that the locking member 2 cannot rotate in the reverse direction. Employing the opening and closing button 1 instead of elastic pieces does not enable the locking protrusion 22 to retract into the circuit breaker housing 3 even if an external force presses the locking protrusion 22, thereby saving parts and improving safety. When the limiting hole 31 is shielded, the locking protrusion 22 cannot extend out of the limiting hole 31, the locking driving surface 23 is obliquely arranged with the movement direction of the opening and closing button 1, limiting the opening and closing button 1 does not enable the opening and closing button 1 to press to the destined position, so that the plug-in circuit breaker cannot be closed.

Preferably, the locking protrusion 22 is a square protruding stand, when the locking protrusion 22 extends out of the limiting hole 31, the two side edges of the square protruding stand are parallel to the two side walls of the limiting hole 31, thereby effectively preventing the plug-in circuit breaker from being inserted into the installation position when it is closed outside the cabinet, and the plug-in circuit breaker from being pulled out after it is installed to the operating position of the cabinet in the closing state. Of course, the locking protrusion 22 is not limited to a square protruding stand, or may be a round boss, or other structures such as a T-shaped protrusion.

Preferably, the locking driving surface 23 is a flat surface, in this way, when the opening and closing button 1 is in slidable fit with the locking driving surface 23, so that it can move smoothly. Of course, the locking driving surface 23 may also be an arc-shaped surface, or have some grooves or protrusions.

The closing and opening button 1 is in slidable fit with the locking driving surface 23 by one end thereof, preferably, one end of the opening and closing button 1 close to the locking member 2 is provided with the driving protrusion 12 fitting with the locking driving surface 23, and the driving protrusion 12 jacks up the locking driving surface 23 during closing. Preferably, when the opening and closing button 1 presses to the destined position, then the plug-in circuit breaker is in the closing state, the driving protrusion 12 is positioned right below the locking protrusion 22 and the limiting hole 31, so as to achieve a better supporting and limiting effect. Of course, one end of the opening and closing button 1 may not be provided with the driving protrusion 12, and the right-angle side edge of one end of the opening and closing button 1 is directly in slidable fit with the locking driving surface 23, or a round corner is arranged on the right-angle side edge of one end thereof to fit with it.

Figure 5:
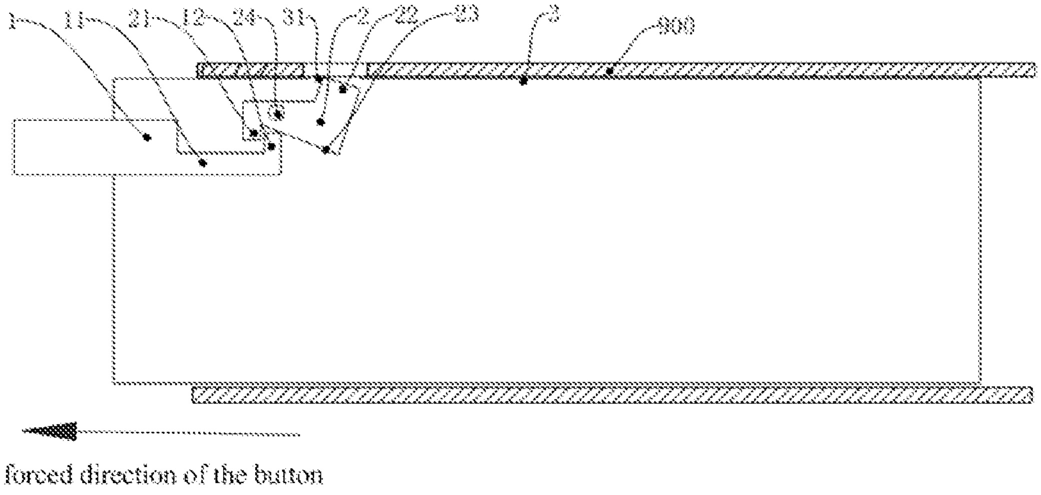
FIG. 5 is a matching state diagram of the locking member and the opening and closing button during retracting the locking protrusion of the locking member into the circuit breaker housing and pulling the opening and closing button to make the circuit breaker open.

Preferably, pulling the opening and closing button 1 enables the plug-in circuit breaker to open, and meanwhile, the locking member 2 rotates to retract the locking protrusion 22 into the circuit breaker housing. As shown in FIGS. 1 and 5, in a preferred embodiment of the locking member 2, the rotation center 24 is provided in the middle of the locking member 2, the rotation center 24 deviates away from one end of the locking protrusion 22, the locking member 2 has the upper portion of one end close to the limiting hole 31 provided with the locking protrusion 22 corresponding to the limiting hole 31, the lower portion away from the limiting hole 31 provided with the locking driving surface 23 fitting with the opening and closing button 1, and the lower portion of one end away from the limiting hole 31 further provided with the activated protruding stand 21. One side of the activated protruding stand 21 is connected with the locking driving surface 23, and the driving protrusion 12 is arranged on one side, close to the locking member 2, of one end of the opening and closing button 1, thus pressing the opening and closing button 1 enables the opening and closing button 1 to fit with the locking driving surface 23 by the driving protrusion 12, so as to jack up the opening and closing button 1, enabling the locking protrusion 22 to extend out of the limiting hole 31, and the circuit breaker is closed. When the plug-in circuit breaker has been installed to the operating position and is in the closing state, pulling out the opening and closing button 1 enables the circuit breaker to switch from the closing state to the opening state. As shown in FIG. 5, pulling out the opening and closing button 1 first enables the opening and closing button 1 to slidably fit with the locking driving surface 23 by means of the driving protrusion 12, then enables the plug-in circuit breaker to open, thus the driving protrusion 12 moves to fit with the activated protruding stand 21 of the locking member 2. Pulling the activated protruding stand 21 enables the opening and closing button 1 to rotate clockwise, thus the locking protrusion 22 rotates and retracts into the circuit breaker housing 3, so that the plug-in circuit breaker can be detached from the operating position when the plug-in circuit breaker is in the opening state. While the opening and closing button 1 actuates the circuit breaker to close and open, the opening and closing button 1 and the locking driving surface 23 are always in contact and slidable fit with each other.

Further preferably, as shown in FIGS. 1,3 and 5, one end of the opening and closing button 1 extending into the circuit breaker is the driving end 11, the button limiting groove 13 is arranged on one side, close to the locking member 2, of the driving end 11 of the opening and closing button 1, the driving protrusion 12 is arranged on one side, close to the locking protrusion 22, of the button limiting groove 13, and the activated protruding stand 21 moves inside the region of the button limiting groove 13. As shown in FIG. 3, when pressing the opening and closing button 1 enables the circuit breaker to be in the closing state, the driving protrusion 12 of the opening and closing button 1 is positioned right below the locking protrusion 22 and the limiting hole 31, the activated protruding stand 21 of the locking member 2 obliquely abuts against the side of the button limiting groove 13 away from the locking protrusion 22, so that the locking member 2 is limited to rotate clockwise, thus retracts into the circuit breaker housing 3. As shown in FIG. 5, when pulling the opening and closing button 1 enables the circuit breaker to open, the activated protruding stand 21 of the locking member 2 fits with the driving protrusion 12, close to on one side of the locking protrusion 22, of the button limiting groove 13, thus pulling the locking member 2 to rotate clockwise enables the locking protrusion 22 to retract into the circuit breaker housing 3. Actuating the driving protrusion 12, the button limiting groove 13, the activated protruding stand 21 and the locking driving surface 23 to fit with each other, not only enables the plug-in circuit breaker to unlock in the opening state, so as to pull out the circuit breaker out of the cabinet, but also enables the button limiting groove 13 and the activated protruding stand 21 to perform a limit function in the closing state, so as to prevent the opening and closing button 1 from rotating in the reverse direction as a limit function, and limiting the rotation range of the locking member 2, thereby greatly improving the reliability of the locking apparatus, in addition, this structure is also quite simple without other components to matched with.

In addition, in order to unlock the circuit breaker by pulling it from the cabinet in the opening state, as a less preferred embodiment of the present invention, it is obvious that the activated protruding stand 21 and/or the driving protrusion 12 may not be arranged in the circuit breaker. For example, after pulling out the opening and closing button 1 has enabled the circuit breaker to open, pulling out the opening and closing button 1 no longer limits the locking member 2, the weight of one end of the locking protrusion 22 arranged on the locking member 2 is greater than the other end, and the locking protrusion 22 rotates and retracts into the circuit breaker housing under the action of gravity. Preferably, the locking member 2 has an eccentric structure, and the rotation center 24 of the locking member 2 is arranged deviating away from one end of the locking protrusion 22. For example, in another solution, the elastic member connected with the locking member 2 is configured to actuate the locking member 2 to rotate in the retraction direction of the locking protrusion 22 into the circuit breaker housing, the elastic member may be a torsion spring or a pressure spring. However, this solution not only raises the number of parts, but also increases the strength of pressing the opening and closing button 1.

Specifically, in the preferred embodiment of the locking member 2 of the present invention as shown in FIG. 1, the locking member 2 has the middle portion rotatably installed inside the circuit breaker housing 3, the upper portion of one end close to the limiting hole 31 provided with a locking protrusion 22, and the lower portion of one end away from the limiting hole 31 provided with the locking driving surface 23 fitting with the opening and closing button 1. The lower portion of the other end of the locking member 2 is further provided with the activated protruding stand 21, one side of which is connected with the locking driving surface 23, and an acute angle is formed between the activated protruding stand 21 and the locking driving surface 23.

Figure 7:
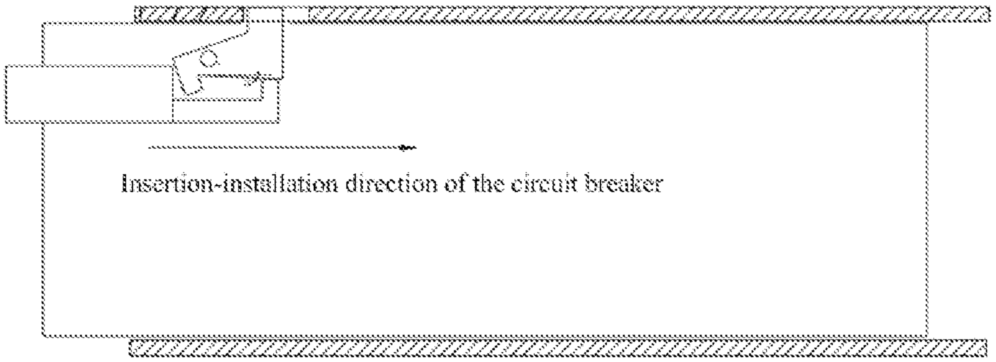
FIG. 7 is a position state view of the locking member and the opening and closing button during correctly installing the circuit breaker in the cabinet and in the closing state.
Figure 8:
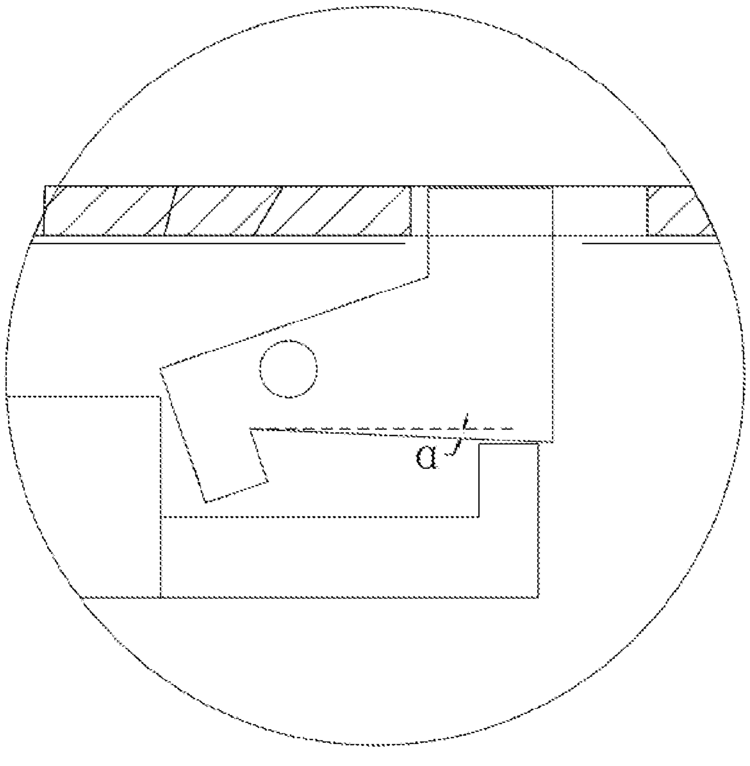
FIG. 8 is a partial enlarged view of FIG. 7.

Further preferably, as shown in FIGS. 7-8, when pressing opening and closing button 1 to the destined position enables the plug-in circuit breaker to enter the closing state, the locking driving surface 23 has an included angle $\alpha$ between itself and the movement direction of the opening and closing button 1, that is, an included angle $\alpha$ between itself and the horizontal direction, and the included angle $\alpha$ is less than 15 degrees. Meanwhile, the driving protrusion 12 may be positioned right below the locking protrusion 22 and the limiting hole 31, and two side edges of the square protruding stand are parallel to two side walls of the limiting hole 31.

As shown in FIG. 6, in an embodiment of the plug-in circuit breaker of the present invention, the breaker includes the circuit breaker housing 3. The opening and closing button 1 is arranged on the circuit breaker housing 3, and the operating mechanism 5 drivingly connected with the opening and closing button 1, the movable contact connected with the operating mechanism, the stationary contact fitting with the movable contact, the arc extinguishing mechanism 8, the wire-outlet end 4, the wire-inlet end 9 and the locking apparatus of the present invention are arranged inside the circuit breaker housing 3. The opening and closing button 1 and the wire-outlet end 4 are arranged at one end of the circuit breaker housing 3, and the wire-inlet end 9 is arranged at the other end of the circuit breaker housing 3. The front panel of the plug-in circuit breaker is positioned on the left side, the plug-in circuit breaker is inserted between the two cabinet sheet metal parts 4 in the insertion installation direction F (shown in FIG. 7) of the circuit breaker, and can be pulled out of the cabinet in the reverse insertion installation direction F of the circuit breaker. The upper side of the circuit breaker housing 3 is provided with the limiting hole 31, and the locking apparatus includes the locking member 2, which is rotatably arranged between the opening and closing button 1 and the limiting hole 31. The operating mechanism 5 is arranged on one side of the opening and closing button 1, and the operating mechanism 5 and the overload protection apparatus 6 are arranged side by side on one side of the opening and closing button 1 and the wire outlet end 4. The short-circuit protection mechanism 7 is positioned between the operating mechanism 5 and the wire inlet end 9, and the short-circuit protection mechanism 7 and the arc extinguishing mechanism 8 are arranged side by side, and positioned on one side of the operating mechanism 5 and the overload protection apparatus 6. Specifically, as shown in FIG. 6, the opening and closing button 1 is arranged on the left side in the circuit breaker, the limiting hole 31 is positioned on the upper side wall of the circuit breaker housing 3, the locking member 2 is positioned on the upper right corner of the button, and positioned between the opening and closing button 1 and the limiting hole 31. The wire-outlet end 4 is arranged below the opening and closing button 1 and on the left side inside the circuit breaker, the wire inlet end 9 is arranged on the right side inside the circuit breaker, the operating mechanism 5 is arranged on the right side of the opening and closing button 1. The overload protection apparatus 6 is arranged below the operating mechanism 5 and on the right side of the wire-outlet end 4, the short-circuit protection mechanism 7 is arranged on the right side of the operating mechanism 5 and the left side of the wire-inlet end 9, the arc extinguishing mechanism 8 is arranged below the short-circuit protection mechanism 7, the right side of the overload protection apparatus 6 and the left side of the wire-inlet end 9.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

What is claimed is:

1. A plug-in circuit breaker comprising a circuit breaker housing provided with a limiting hole and a opening and closing button, wherein the circuit breaker further includes a locking member, said locking member is rotatably arranged inside said circuit breaker housing, and has the upper portion close to said limiting hole provided with a locking protrusion fitting with said limiting hole, and the lower portion provided with a locking driving surface fitting with said opening and closing button;

pressing said opening and closing button enables said opening and closing button to abut against said locking driving surface of said locking member, thus said locking protrusion of said driving locking member rotates to said limiting hole of said circuit breaker housing, when said limiting hole is not shielded, said opening and closing button jacks up said locking driving surface to enable said locking protrusion to extend out of said limiting hole, and the plug-in circuit breaker is closed, when said limiting hole is shielded, so that said locking protrusion cannot extend out of said limiting hole, thus said locking driving surface limits said opening and closing button, so that said opening and closing button cannot press to the destined position, and the plug-in circuit breaker cannot be closed.

2. The plug-in circuit breaker according to claim 1, wherein pulling said opening and closing button enables the plug-in circuit breaker to open, and meanwhile, said locking member rotates to retract said locking protrusion into the circuit breaker housing.

3. The plug-in circuit breaker according to claim 1, wherein one end of said opening and closing button close to said locking member is provided with a driving protrusion fitting with said locking driving surface.

4. The plug-in circuit breaker according to claim 3, wherein said locking member has the lower portion of one end away from said limiting hole further provided with an activated protruding stand, one side of said activated protruding stand is connected with said locking driving surface, when pulling out said opening and closing button enables the circuit breaker to switch from the closing state to the opening state, said driving protrusion of said opening and closing button pulls said activated protruding stand to enable said opening and closing button to rotate, so that said locking protrusion rotates and retracts into said circuit breaker housing.

5. The plug-in circuit breaker according to claim 4, wherein one end of said opening and closing button extending into the circuit breaker is a driving end, a button limiting groove is arranged on one side, close to said locking member, of said driving end of said opening and closing button, said driving protrusion is arranged on one side, close to said locking protrusion, of said button limiting groove, when the circuit breaker is in the closing state, said activated protruding stand of said locking member obliquely abuts against the side of said button limiting groove away from said locking protrusion.

6. The plug-in circuit breaker according to claim 1, wherein said locking protrusion is a square protruding stand.

7. The plug-in circuit breaker according to claim 3, wherein when the plug-in circuit breaker is in the closing state, said driving protrusion is positioned right below said locking protrusion and said limiting hole.

8. The plug-in circuit breaker according to claim 4, wherein an acute angle is formed between said activated protruding stand and said locking driving surface.

9. The plug-in circuit breaker according to claim 1, wherein the plug-in circuit breaker is in the closing state, said locking driving surface has an included angle $\alpha$ between itself and the movement direction of said opening and closing button, said included angle $\alpha$ is less than 15 degrees.

10. The plug-in circuit breaker according to claim 1, wherein an operating mechanism drivingly connected with said opening and closing button, a movable contact connected with said operating mechanism, a stationary contact fitting with said movable contact, an arc extinguishing mechanism, a wire-outlet end and a wire-inlet end are arranged inside said circuit breaker housing, said opening and closing button and said wire-outlet end are arranged at one end of said circuit breaker housing, said wire-inlet end is arranged at the other end of said circuit breaker housing, the upper side of said circuit breaker housing is provided with said limiting hole, said locking member is rotatably arranged between said opening and closing button and said limiting hole.

11. The plug-in circuit breaker according to claim 10, wherein said operating mechanism is arranged on one side of said opening and closing button, and said operating mechanism and an overload protection apparatus are arranged side by side on one side of said opening and closing button and said wire outlet end, said short-circuit protection mechanism is positioned between said operating mechanism and said wire inlet end, said short-circuit protection mechanism and said arc extinguishing mechanism are arranged side by side, and positioned on one side of said operating mechanism and said overload protection apparatus.

12. The plug-in circuit breaker according to claim 1, wherein a rotation center is provided in the middle of said locking member, said rotation center is arranged deviating away from one end of said locking protrusion, said locking member has the lower portion of one end away from said limiting hole further provided with an activated protruding stand, one side of the activated protruding stand is connected with said locking driving surface, one end of said opening and closing button close to said locking member is provided with a driving protrusion, said driving protrusion and said locking driving surface always keep slidable fit with each other.

* * * * *